United States Patent
Vos et al.

(10) Patent No.: US 8,139,104 B2
(45) Date of Patent: Mar. 20, 2012

(54) AUTOSTEREOSCOPIC DISPLAY DEVICE

(75) Inventors: Gerardus Johannes Josephus Vos, Eindhoven (NL); Stein Kuiper, Eindhoven (NL); Bernardus Hendrikus Wilhelmus Hendriks, Eindhoven (NL); Bas Jan Emile Van Rens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1311 days.

(21) Appl. No.: 10/599,790

(22) PCT Filed: Apr. 4, 2005

(86) PCT No.: PCT/IB2005/051104
§ 371 (c)(1),
(2), (4) Date: Oct. 10, 2006

(87) PCT Pub. No.: WO2005/101855
PCT Pub. Date: Oct. 27, 2005

(65) Prior Publication Data
US 2008/0316302 A1    Dec. 25, 2008

(30) Foreign Application Priority Data

Apr. 13, 2004  (EP) .................................... 04101494

(51) Int. Cl.
*H04N 13/04* (2006.01)
(52) U.S. Cl. ................ 348/51; 345/6; 359/463
(58) Field of Classification Search ................. None
See application file for complete search history.

(56) References Cited

U.S. PATENT DOCUMENTS

| | | | |
|---|---|---|---|
| 5,493,427 A | | 2/1996 | Nomura et al. |
| 5,936,774 A | * | 8/1999 | Street ............................ 359/630 |
| 6,014,259 A | * | 1/2000 | Wohlstadter .................. 359/619 |
| 6,795,241 B1 | * | 9/2004 | Holzbach ...................... 359/463 |
| 6,924,792 B1 | * | 8/2005 | Jessop .......................... 345/179 |
| 2002/0036825 A1 | | 3/2002 | Lipton et al. |
| 2003/0016444 A1 | * | 1/2003 | Brown et al. ................. 359/462 |

FOREIGN PATENT DOCUMENTS

| | | |
|---|---|---|
| WO | 9821620 | 5/1998 |
| WO | 03007620 A1 | 1/2003 |
| WO | 03069380 A1 | 8/2003 |
| WO | 03071335 A2 | 8/2003 |
| WO | 2004102251 A1 | 11/2004 |

OTHER PUBLICATIONS

Paul Bourke; "Autostereoscopic Lenticular Images", Dec. 1999. http://astronomy.swin.edu.au/-pbourke/stereographics/lenticular/.
ISR: PCT/IB05/051104.
Written Opinion: PCT/IB05/051104.

* cited by examiner

*Primary Examiner* — Christopher S Kelley
*Assistant Examiner* — Christopher Findley

(57) ABSTRACT

The present invention relates to an autostereoscopic display device, comprising an imaging layer (9) and a lens layer (10). The lens layer (10) serves to project different content from the imaging layer (9) to the left and right eyes, respectively, of a user. The lens layer (10) comprises lens cells (12), enclosing two fluids (13, 14) with different refractive indices. The shape of the interface between the fluids may be changed using electrowetting, by means of two individually controllable electrodes (21, 22) at the sides of each lens cell (12). The display device further comprises a user head tracking device and means for controlling the lens cell electrodes depending on a detected user head position. This allows the display device to display a correct 3D-image, even if the user moves his head.

11 Claims, 2 Drawing Sheets

AUTOSTEREOSCOPIC DISPLAY DEVICE

FIELD OF THE INVENTION

The present invention relates to a display device, comprising an imaging layer with a plurality of picture elements and a lens layer comprising a plurality of lens elements for projecting light from different picture elements in the imaging layer to the left and right eyes of a user in order to provide an autostereoscopic effect, wherein each lens element comprises at least one lens cell which defines a closed space, having a front wall, facing the user, a back wall facing the imaging layer and side walls, connecting the back and front walls, the closed space being filled with first and second substantially immiscible fluids having different refractive indices, each cell comprising means for varying the shape of the interface between the first and second fluids

BACKGROUND OF THE INVENTION

Such a device, based on the so called electrowetting effect, is disclosed in WO, 03/071335, A2. In order to provide a correct autostereoscopic image in such devices, a predetermined position of the users eyes in relation to the display device is assumed. If the user moves his head, and thereby his eyes, out of the predetermined position, the image will be distorted. It would be possible to provide a display where a correct image is displayed at more than one allowed head position, but this requires a more complex imaging layer with higher resolution. Moreover, between the allowed head positions, the image is still not displayed correct to the user.

SUMMARY OF THE INVENTION

It is an object of the present invention to wholly or partly solve the above mentioned problems.

This object is achieved by a display device according to claim 1 and a method according to claim 9.

More specifically, according to a first aspect, the invention relates to a display device, comprising an imaging layer with a plurality of picture elements and a lens layer comprising a plurality of lens elements for projecting light from different picture elements in the imaging layer to the left and right eyes of a user in order to provide an autostereoscopic effect, wherein each lens element comprises at least one lens cell which defines a closed space, having a front wall, facing the user, a back wall facing the imaging layer and side walls, connecting the back and front walls, the closed space being filled with first and second substantially immiscible fluids having different refractive indices, each cell comprising means for varying the shape of the interface between the first and second fluids. According to the invention the side walls of each cell comprise at least a first and a second individually controllable electrode, the display device comprises a tracking device for determining the position of a users head, and controlling means for controlling potentials of said first and second electrodes based on said position.

This allows the display device to be adjusted in accordance with the user head movements, in order to display an autostereoscopic, three dimensional image correctly. Preferably, each lens element is elongated and covers a linear segment of the imaging layer from top to bottom and each lens element may comprise a single lens cell. This provides an arrangement with low complexity.

In an alternative embodiment, each lens element may comprise a plurality of lens cells. This allows using fluids with more different densities.

In the alternative embodiment, the lens cells may be individually controllable. This allows optionally different display modes, e.g. for the top and bottom parts of the display.

In a preferred embodiment, the display device comprises selecting means for switching the display device into a 2D-mode, such that the controlling means makes the interface between the first and second fluids to be substantially flat.

Preferably, the first fluid is an electrically conductive fluid, such as a salt water solution, the second fluid is a non conducting fluid, such as an oil, and the inner front and side walls are covered with an hydrophobic layer. This allows changing the shape of the interface between the first and second fluids using electrowetting.

In a preferred embodiment the tracking device comprises a video camera. This allows the user head position to be determined using image analysis methods.

According to a second aspect, the invention relates to a method for displaying an image with an autostereoscopic effect, comprising using a display device, comprising an imaging layer with a plurality of picture elements and a lens layer comprising a plurality of lens elements for projecting light from different picture elements in the imaging layer to the left and right eyes of a user, wherein each lens element comprises at least one lens cell which defines a closed space, having a front wall, facing the user, a back wall facing the imaging layer and side walls, connecting the back and front walls, the closed space being filled with first and second substantially immiscible fluids having different refractive indices, each cell comprising means for varying the shape of the interface between the first and second fluids, wherein the side walls of each cell comprise at least a first and a second individually controllable electrode, determining the position of a users head using a tracking device, and controlling potentials of said first and second electrodes based on said determined head position.

This method provides advantages similar to those of the display device.

These and other aspects of the invention will be apparent from and elucidated with reference to the embodiments described hereinafter.

DESCRIPTION OF PREFERRED EMBODIMENTS

Figure 1:
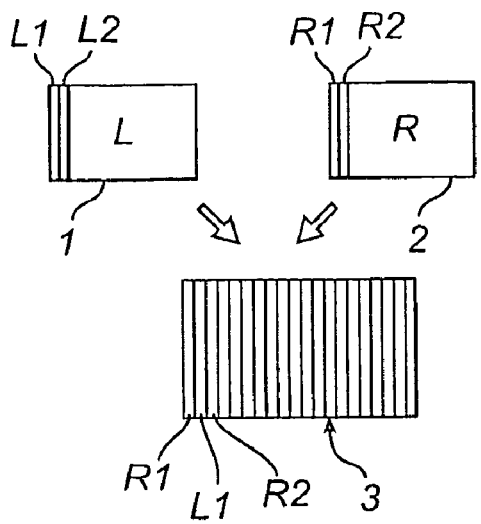
FIGS. 1 and 2 illustrate schematically a concept for obtaining an autostereoscopic image.
Figure 2:
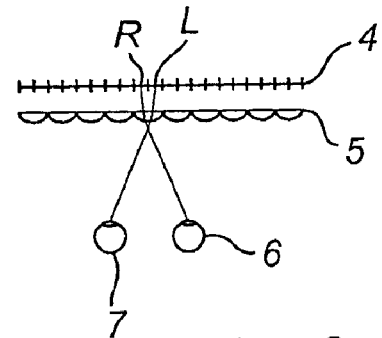

FIGS. 1 and 2 illustrate schematically a concept for obtaining an autostereoscopic image. By an autostereoscopic image is meant an image that to a user appears to be 3-dimensional, without the use of special glasses.

With reference to FIG. 1, a first image 1 is intended to be displayed to the left eye of a user, whereas a second image 2 is intended to be displayed to the right eye of a user. Such images may be obtained e.g. by photographing an object with two offset cameras, much like the human eyes. It is of course possible to obtain such images in many other ways.

From the first and second images 1, 2 a composite image 3 may be obtained by interleaving thin vertical slices L1, L2, etc.; R1, R2, etc. from the first and second images 1, 2 in an ordered manner (from left to right: leftmost slice from second image, leftmost slice from first image, second leftmost slice from second image etc.). The composite image may be displayed e.g. using a liquid crystal display (LCD).

FIG. 2 illustrates an arrangement for projecting such a composite image, displayed by a liquid crystal display 4, to a users eyes 6, 7. The arrangement comprises a lens layer 5 including a plurality of juxtaposed, cylindrical plano-convex lenses. Each lens covers two slices R, L in the displayed composite image and serves to project light from a slice R towards the right eye 6 of a user, and light from a slice L towards the left eye 7 of a user. This resembles very much the concept used in so called "3D-Postcards", where the composite image is printed on paper and the lens layer comprises a moulded plastic sheet.

Figure 3:
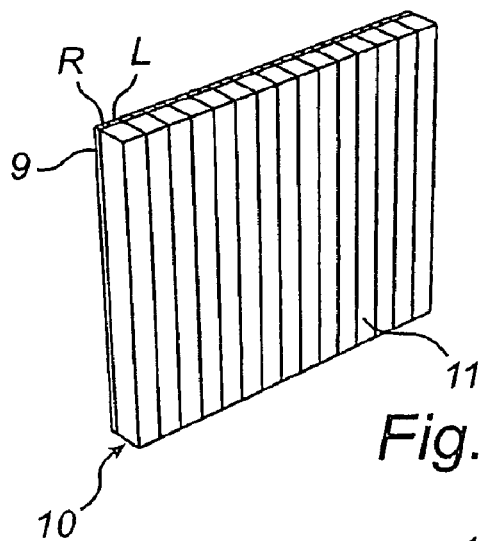
FIG. 3 illustrates a display device according to an embodiment of the invention, comprising an image layer and a lens layer.

FIG. 3 illustrates a display device according to an embodiment of the invention, comprising an image layer 9 and a lens layer 10. The image layer 9 preferably comprises a backlighted LCD-layer (LCD=Liquid Crystal Display), which per se is well known to the skilled person and will not be described in greater detail. The lens layer 10 comprises a plurality of juxtaposed elongated lens elements 11, which extend in a vertical direction as seen by a user. Each lens element of FIG. 3 corresponds to one lens 5 in FIG. 2. FIG. 3 is schematically drawn; a display device will in most cases comprise a considerably larger number of lens elements.

Figure 4:
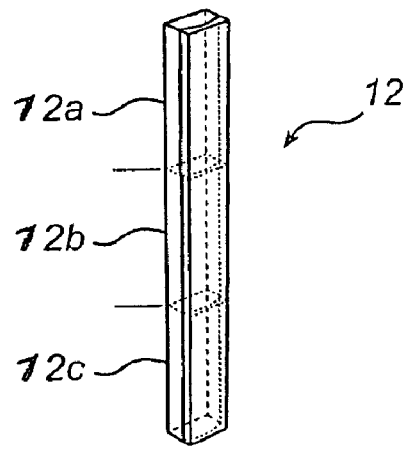
FIG. 4 illustrates a lens element in the display device of FIG. 3.

FIG. 4 illustrates a lens element in the display device of FIG. 3. In this embodiment, each element comprises one lens cell 12, as will be described later. However, each lens element 11 may in an alternative embodiment comprise more than one lens cell 12a, 12b, 12c, as indicated by dashed lines in FIG. 4. These cells 12a, 12b, and 12c may be controlled together or individually.

Figure 5:
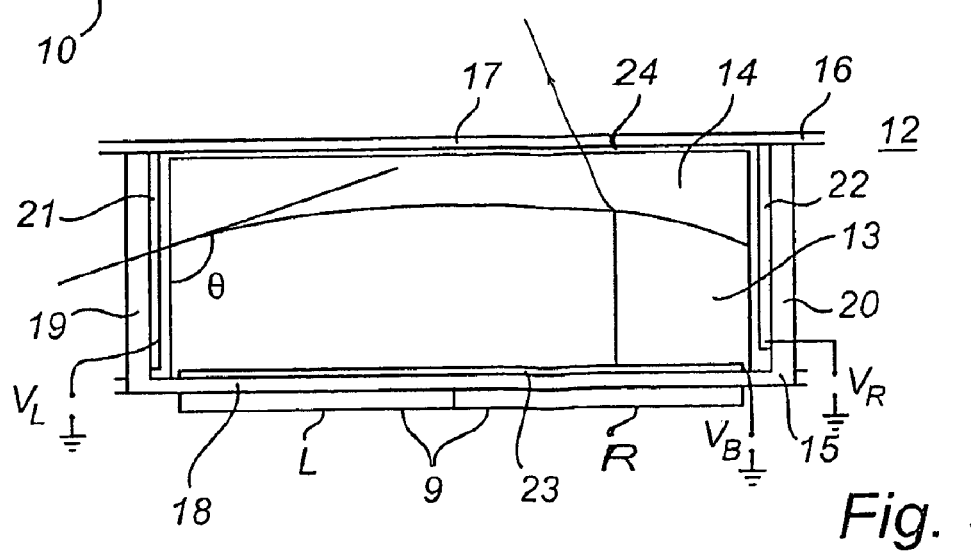
FIG. 5 illustrates, more detailed, a cross section through the lens element of FIG. 4 and the corresponding part of the image layer.

FIG. 5 illustrates, more detailed, a cross section through the lens cell 12 of FIG. 4 and the corresponding part of the image layer 9. A first 15 and a second 16 substrate accomplish a lens cell 12, which defines a closed space, having a front wall 17, facing the user, a back wall 18 facing the imaging layer 9 and side walls 19, 20, connecting the back and front walls 18, 17. The first and second substrates 15, 16 may be made of glass. The lens cell is filled with a first fluid 13 and a second fluid 14. The first fluid 13 may consist of water containing a salt solution, and the second fluid may consist of an oil, such as a silicone oil or an alkane. The first and second fluids 13, 14 should preferably have substantially equal densities, in order to make the display orientation independent, however the density characteristics requirement may be somewhat reduced by dividing each lens element 11 into a plurality of lens cells, as indicated in FIG. 4. The walls used for this division may be treated such that the contact angle of the interface between the fluids is 90° at each wall. This may be achieved by using a coating or an electrode that can be used to alter the contact angle electrically (electrowetting). The density of the first fluid 13 may be adjusted by changing the salt concentration. The density of the second fluid 14 may be increased by adding molecular constituents.

The first and second fluids 13, 14 should be substantially immiscible, as is the case with water and the above mentioned oils. Moreover their respective refractive indices should be substantially different. The first fluid 13 (salt solution) may have a refractive index in the range between 1.32 and 1.50 depending on the salt concentration. Depending on which oil is used as the second fluid 14, the refractive index may vary between 1.25 and 1.70. In the illustrated embodiment, the first fluid 13 has a higher refractive index than the second fluid 14, although an embodiment where the reversed relationship exists is also equally conceivable. The first fluid 13 is polar and conductive, whereas the second fluid 14 is electrically insulating.

The side walls 19, 20 of the lens cell 12 each comprise an individually controllable electrode 21, 22. The back wall 18 comprises a back wall electrode 23, which is light permeable, or a small metal electrode that covers only a small part of the surface of the back wall 18. The electrodes are conductive and may consist e.g. of ITO (Indium Tin Oxide). The front 17 and side walls 19, 20 of the cell comprise a hydrophobic layer 24, which may consist of e.g. an amorphous fluorocarbon, such as TEFLON® AF1600. The hydrophobic effect of this layer will, in a relaxed state, cause the first fluid 13 to wet as little as possible of the lens cell wall areas apart from the back wall 18. Thus the interface between the first and second fluids 13, 14 will constitute a meniscus, providing a particular contact angle θ with the side walls 19, 20. As indicated in FIG. 5, the meniscus between the first and second fluids 13, 14 serves to refract incident light such that the lens cell 12 functions as a positive lens. In an alternative embodiment, where the refractive index of the first fluid 13 is lower than the refractive index of the second fluid 14, the meniscus should curve in the opposite direction in order to provide a positive lens.

The hydrophobic layer (e.g. AF1600) also serves as an electrically insulating coating for the electrodes 21 and 22. In order to further improve the insulation, an extra coating may be deposited underneath the hydrophobic layer, for example a parylene coating. The shape of the meniscus, and the contact angle of each meniscus to side wall intersection may be altered by applying different potentials to the electrode 21 of the first wall 19, the electrode 22 of the second wall 20 and the back electrode 23. If a voltage $V_L$-$V_B$ is applied between the electrode 21 of the first wall 19 and the back electrode 23, the conductive first fluid 13 is forced, by static electric force, to cover a greater area of the hydrophobic layer 24, which entails a different contact angle θ and a differently shaped meniscus.

Since the potentials $V_L$, $V_R$ of the side wall electrodes 21, 22 are individually controllable, it is not only possible to obtain a meniscus with variable convexity, but also a tilted meniscus, as will be described below.

Figure 6:
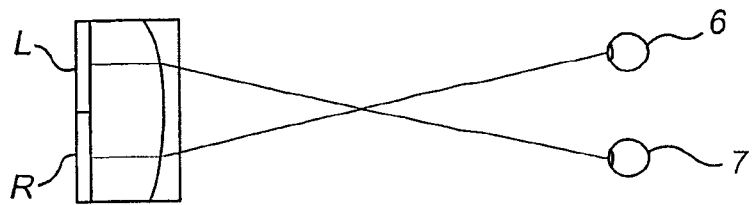
FIG. 6 illustrates schematically the lens element in FIG. 4 in a first mode.

FIG. 6 illustrates schematically the lens element in FIG. 4 in a first mode. In the first mode, the voltage $V_L$-$V_B$ of the first electrode 21 is equal to the voltage $V_R$-$V_B$ of the second electrode 22 (e.g. $V_R$=−50V; $V_L$=−50V; $V_B$=0V). In this mode, the lens element 11 is optimised for displaying content from left L and right R sub-images slices to the left and right eyes of a user, respectively, when the user is placed straight in front of the leas element 11.

Figure 7:
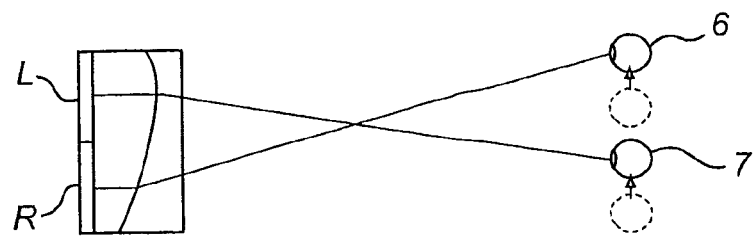
FIG. 7 illustrates schematically the lens element in FIG. 4 in a second mode.

FIG. 7 illustrates schematically the lens element in FIG. 4 in a second mode. In the second mode, the voltage $V_L$-$V_B$ of the first electrode 21 is greater than the voltage $V_R$-$V_B$ of the second electrode 22 (e.g. $V_R$=−75V; $V_L$=−25V; $V_B$=0V). This entails different contact angles θ at the first 19 and second 20 side walls, and the meniscus is tilted. In this mode, the lens element 11 is optimised for displaying content from left L and right R sub-images slices to the left and right eyes of a user, respectively, when the user is laterally displaced to the right in relation to the lens element 11 as compared to the position in FIG. 6 (dashed).

Figure 8:
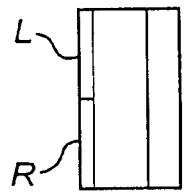
FIG. 8 illustrates schematically the lens element in FIG. 4 in a third mode.

FIG. 8 illustrates schematically the lens element in FIG. 4 in a third mode. In the third mode, the voltage $V_L$-$V_B$ of the first electrode 21 is equal to the voltage $V_R$-$V_B$ of the second electrode 22 (e.g. $V_R$=−100 V; $V_L$=−100V; $V_B$=0 V). The voltages are chosen such, that the contact angle θ at both side walls 19, 20 equals 90°. In this mode, the lens element 11 does not function as a lens, but is optimised for displaying content two-dimensionally and at double resolution. That is, in the third mode the image layer is intended to display a regular image instead of a composite image. Selecting means, such as a button, may be provided on the display device for switching between 2D and 3D. Note that $V_B$ in all modes is 0 V, such that the back electrode 23 may be connected to earth. However, other voltage combinations are of course possible.

It is possible to add an extra lenticular sheet in front of the variable lenses in order to give the strength of the lenses a certain offset. In case of a lenticular sheet with positive lenses, the electrowetting lenses should have negative strength when displaying two-dimensional content.

Figure 9:
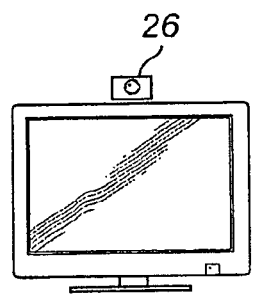
FIG. 9 illustrates the display device according to an embodiment of the invention comprising user head and eyes tracking means.

FIG. 9 illustrates the display device according to an embodiment of the invention comprising user head and eyes tracking means 26. In a preferred embodiment, the user head tracking means may comprise an image sensor, such as a video camera. The image sensor captures an image of the environment in front of the display device, in order to estimate the position of the user's head and eyes.

A number of methods for tracking head and eye positions using image analysis are known in the art. One possible method is to use skin colour segmentation to find the face of the user in the image, i.e. to distinguish an area in the image where the colour composition of the image deviates less than a predetermined threshold value from the expected colour composition of a face.

If a face area has been detected, the location of the eyes in this area may be assumed, or a specific eye detection method may be used. Such a method may be based on the fact that most users blink both eyes simultaneously. This means that in successive image frames, two areas in the face provide fast and synchronised variations, which may be detected by an image analysis algorithm.

The image sensor data may if needed be combined with data from a distance measurement sensor similar to those used in auto focus functions of regular cameras.

Other image analysis based head tracking functions are described in the art, e.g. in U.S. Pat. No. 6,580,810, B1. However, also other methods for determining the position of the users head and eyes would be conceivable, e.g. letting the user wear an object whose position may be determined using an electromagnetic field.

Figure 10:
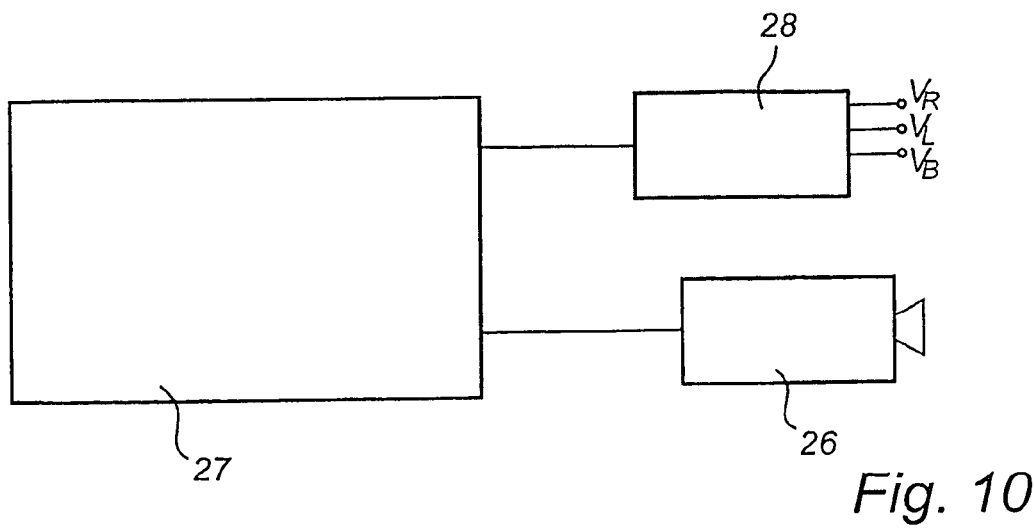
FIG. 10 illustrates schematically functional modules in a display device according to an embodiment of the invention.

FIG. 10 illustrates schematically functional modules in a display device according to an embodiment of the invention. An image sensor 26 delivers image information to a processor unit 27. Based on the received information, the processor unit 27 determines the relative position of the users head vis-à-vis the display device. The processor unit 27 together with the image sensor constitute head tracking means, or alternatively eye tracking means, if the processor unit 27 determines the user eye positions.

User head and/or eye position information thus achieved is fed from the processing unit 27 to a control unit 28. Based on the information received, the control unit feeds driving signals VR, VL, VB to the electrodes of the respective lens cells 12 in the lens layer 10 of the display device. The value of the driving signals may be calculated based on the position information, or may be retrieved for each lens cell from a lookup table. Note that the different lens cells 12 should receive different driving signals since their individual relative positions to the user's head are different.

It should be understood that various parts of the functional modules 26, 27, 28 could be realised in different ways, e.g. as software routines executed by a processor, as ASIC hardware implementations etc. They could also be integrated with each other in different ways.

In summary, the invention relates to an autostereoscopic display device, comprising an imaging layer and a lens layer. The lens layer serves to project different content from the imaging layer to the left and right eyes, respectively, of a user. The lens layer comprises lens cells, enclosing two fluids with different refractive indices. The shape of the interface between the fluids may be changed using electrowetting, by means of two individually controllable electrodes at the sides of each lens cell. The display device further comprises a user head tracking device and means for controlling the lens cell electrodes depending on a detected user head position. This allows the display device to display a correct 3D-image, even if the user moves his head.

The invention is not restricted to the described embodiment. It can be altered in different ways within the scope of the appended claims.

The invention claimed is:

1. Display device, comprising an imaging layer with a plurality of picture elements and a lens layer comprising a plurality of lens elements for projecting light from different picture elements in the imaging layer to the left and right eyes of a user in order to provide an autostereoscopic effect, wherein each lens element comprises at least one lens cell which defines a closed space, having a front wall, facing the user, a back wall facing the imaging layer and side walls, connecting the back and front walls, wherein the side walls of each lens cell comprise at least a first and a second-individually controllable electrode, the closed space being filled with first and second immiscible fluids having different refractive indices, each cell comprising means for varying the radius of curvature and/or tilt of the interface between the first and second fluids, the first and second fluids serving to refract incident light such that the lens cell functions as a positive lens having a spherical shape via controllable contact angles with the side walls of the lens cell by varying said first and second individually controllable electrodes voltage potentials on said side wall electrodes, the display device comprises a tracking device for determining the position of a users head, and controlling means for controlling potentials of said first and second electrodes based on said position.

2. The display device according to claim 1, wherein each lens element is elongated and covers a linear segment of the imaging layer from top to bottom.

3. The display device according to claim 2, wherein each lens element-comprises a single lens cell.

4. The display device according to claim 2, wherein each lens element comprises a plurality of lens cells.

5. The display device according to claim 4, wherein said lens cells are individually controllable.

6. The display device according to claim 1, comprising selecting means for switching the display device into a 2D-mode such that the controlling means for controlling potentials of said first and second electrode the interface between the first and second fluids to be substantially flat.

7. The display device according to claim 1, wherein the first fluid is an electrically conducting fluid, and wherein the second fluid is an electrically non conducting fluid, and wherein the inner front and side walls are covered with an hydrophobic layer.

8. The display device according to claim 1, wherein the tracking device comprises a video camera.

9. The display device according to claim 7, wherein the first fluid is an aqueous salt solution.

10. The display device according to claim 7, wherein the second fluid is an oil.

11. A method for displaying an image with an autostereoscopic effect, comprising
   using a display device, comprising an imaging layer with a plurality of picture elements and a lens layer comprising a plurality of lens elements for projecting light from different picture elements in the imaging layer to the left and right eyes of a user, wherein each lens element comprises at least one lens cell which defines a closed space, having a front wall, facing the user, a back wall facing the imaging layer and side walls, connecting the back and front walls, wherein the side walls of each cell comprise at least a first and a second individually controllable electrode, the closed space being filled with first and second immiscible fluids having different refractive indices, each cell comprising means for varying the radius of curvature and/or tilt of the interface between the first and second fluids, the first and second fluids serving to refract incident light such that the lens cell functions as a positive lens having a spherical shape via controllable contact angles with the side walls of the lens cell by varying said first and second individually controllable electrodes voltage potentials on said side wall electrodes,
   determining the position of a users head using a tracking device,
   and controlling potentials of said first and second electrodes based on said determined head position.

* * * * *